United States Patent [19]

Seo et al.

[11] Patent Number: 5,523,907
[45] Date of Patent: Jun. 4, 1996

[54] DOOR MECHANISM FOR A TAPE RECORDER

[75] Inventors: Jae K. Seo; Do Y. Choi; Young H. Cho, all of Suwon, Rep. of Korea

[73] Assignee: Samsung Electronics Co., Ltd., Kyungki-do, Rep. of Korea

[21] Appl. No.: 279,791

[22] Filed: Jul. 25, 1994

[30] Foreign Application Priority Data

Jul. 26, 1993 [KR] Rep. of Korea .................. 93-14170

[51] Int. Cl.⁶ .................................................. G11B 15/675
[52] U.S. Cl. .................................................. 360/96.5
[58] Field of Search ........................... 360/85, 96.5, 96.6

[56] References Cited

U.S. PATENT DOCUMENTS 5,408,370  4/1995  Shiokawa et al. .................. 360/85

Primary Examiner—Robert S. Tupper
Attorney, Agent, or Firm—Sughrue, Mion, Zinn, Macpeak & Seas

[57] ABSTRACT

A door mechanism of a tape recorder includes a door axially-coupled at one side of an eject lever for being opened/closed around a pivot shaft during the pivoting of the eject lever, and a link for guiding the opening/closing operation of the door during the pivot operation of the eject lever, in which the door is positioned higher than a cassette lid so as not to contact the cassette lid during a first loading operation of a tape cassette and is positioned as high as the upper end portion of the eject lever after a second loading operation of the tape cassette is completed, thereby permitting the design of an extremely thin tape recorder.

3 Claims, 3 Drawing Sheets

DOOR MECHANISM FOR A TAPE RECORDER

BACKGROUND OF THE INVENTION

1. Field of the Invention

The present invention relates to a tape recorder and, more particularly, to a door mechanism for a tape recorder for preventing a cassette lid of a tape cassette from being damaged by contacting a door of the door mechanism while a slider is moved toward an upper chassis when the tape cassette is loaded in the tape recorder.

2. Description of the Related Art

Generally, magnetic recording/reproducing apparatuses such as a video tape recorder already have been developed in various forms by advanced companies, and currently are spread to almost every home and are considered as a staple commodity in modern society.

The currently-prevailing household magnetic recording/reproducing apparatuses utilize ½ inch tape cassettes which mostly adopt video home system (VHS). Such a magnetic recording/reproducing apparatus largely has a cassette holder which holds the tape cassette, and driving members which pull the cassette holder into the interior of a main body thereof to seat the cassette holder on a main deck. In addition to these, a unit which loads or unloads a magnetic tape in the tape cassette toward a rotary drum installed on the main drum, and units for allowing the magnetic tape to tavel along a predetermined path are provided.

Thus, once the tape cassette is inserted into the interior of the cassette holder, the insertion is monitored to seat the tape cassette on the main deck. Under this circumstance, the magnetic tape is loaded toward the rotary drum rotating at high speed by means of a pair of pole bases to record signals on the magnetic tape or reproduce the signals recorded thereon.

In recent years, an article such as a portable camcorder developed by applying the above-mentioned magnetic recording/reproducing apparatus tends to be miniaturized in pursuit of a lightweight size with a view toward convenience for the user. As a pan of this endeavor, many products adopt the currently and widely available 8 mm tape cassette.

One factor that exerts an influence on the miniaturization and lightweightness is a deck size, and, since the miniaturization and lightweightness of the article can be achieved in connection with the reduced ratio of the deck size, the barometer of the technical advancement can be measured by the reduced degree of the deck size. Actually, magnetic recording/reproducing apparatuses of various types and systems have been studied and developed.

As a result of the research and development, the inventors of the present invention already developed a magnetic recording/reproducing apparatus capable of maximally reducing the deck size and simplifying the components, which is described in Korean Patent Application No. 93-5016. In this device, a tape cassette is inserted into a cassette holder having a rotary drum to perform the first loading of a magnetic tape, and the cassette holder is then closed by being pressed to fully load the magnetic tape, wherein the rotary drum is completely held within an internal space of the tape cassette while the loading operation of the tape cassette is completed, thereby highly miniaturizing the deck size. This apparatus will be briefly described below.

FIG. 1 is a side view showing the magnetic recording/reproducing apparatus by the previously proposed technique. Ends of a pair of arms 10a extending to the rear portion of an eject lever 10 are coupled with ends of a pair of brackets 11, which are erected in the interior of a main body (not shown) of the apparatus, by means of a shaft 11a to enable the opening/closing operation upwardly and downwardly around the shaft 11a. During an ejecting operation, the eject lever 10 is exposed out of the main body by a predetermined angle upon the release of a locking pin 10b on the front of the eject lever 10 to insert or eject a tape cassette 20 into or out of the main body.

Also, a pair of downwardly facing elastic members 12 are attached on the inner surface of the eject lever 10. The tape cassette 20 is prevented from floating by pressing the upper surface of the tape cassette 20 with the elastic members 12, under the state wherein the pressing operation of the eject lever 10 is completed.

A pin 10c provided on one side of the arm 10a of the eject lever 10 is fitted into an elongated hole 30b of a bracket 30a erected on the side of an upper chassis 30 to make the upper chassis 30 vertically ascend or descend when the eject lever 10 pivots upwardly or downwardly.

A cassette holder 40 for receiving the tape cassette 20, a slider 50 for moving the cassette holder 40 forwardly and backwardly in the horizontal direction, and the upper chassis 30 mounted with a rotary drum 31 for the first loading operation of a magnetic tape (not shown) within the tape cassette 20 during the horizontal movement of the slider 50 are all arranged to fit under the eject lever 10 when the loading of the cassette is completed.

One end of the cassette holder 40 is connected to one end of the slider 50 by means of a shaft 40a, and a first link 41 formed near the center thereof is connected to a second link 42 which is inserted to slide along an elongated hole 50b in the bracket 50a formed on the side of the slider 50 by means of a pin 43. Therefore, the cassette holder 40 can pivot around the shaft 40a by a predetermined angle to insert and eject the tape cassette 20.

A lid-opening member 44 which pivots upwardly and downwardly around a shaft 44a on one side thereof is installed on one side of the cassette holder 40. An elongated hole 44b formed approximately in the center of the lid-opening member 44 is fitted with a pin 40b projecting on the side of the cassette holder 40 thereby to guide the pin 40b.

The center of the lid-opening member 44 is coupled with the slider 50 by means of a third link 45 inclined by a predetermined angle, and the second link 42 and the third link 45 are connected by an elastic member 46. Accordingly, during seating of the cassette holder 40 on the slider 50, the lid-opening member 44 about the shaft 44a to open a lid 20a of the tape cassette 20.

Moreover, a reel base 51 is mounted on the slider 50, and a reel 53 is installed on the reel base 51 to guide a hub (not shown) of the tape cassette 20, and the forward and backward movement of the slider 50 in the horizontal direction is executed by means of a slider transportation apparatus (not shown) installed on the upper chassis 30.

A lower chassis 60, mounted with travelling elements for driving the magnetic tape within the tape cassette 20, is installed below the upper chassis 30.

On sides of the upper chassis 30 and lower chassis 60, pins 60c projecting on respective ends of a pair of intersecting fourth and fifth links 60a and 60b, in which the Scott Russel's link mechanism principle is employed, are mounted with an elastic member 61 to hook respective links 60a and 60b, thereby elastically raising and lowering the upper chassis 30 in the vertical direction.

In the previously proposed magnetic recording/reproducing apparatus, when the cassette holder 40 is forced to be closed, after the tape cassette 20 is inserted into the inside the cassette holder 40 placed on the inner side of the eject lever 10 which is exposed out of the main body by a predetermined angle, the cassette holder 40 rotates around the shaft 40a to be seated on the slider 50. At this time, the hub of the tape cassette 20 is guided by the reel 53 installed on the slider 50, and, simultaneously, the lid-opening member 44 on the side of the cassette holder 40 rotates clockwise around the shaft 44a to open the lid 20a of the tape cassette 20.

Under the above-described circumstance, if the cassette holder 40 is pushed toward the upper chassis 30, the slider transportation apparatus mounted on the upper chassis 30 horizontally transports the slider 50 toward the upper chassis 30 to enable the first loading operation of the magnetic tape with respect to the rotary drum 31.

However, in the previously proposed mechanism constructed as above, during the first loading operation, the height of the cassette lid 20a, which was opened by sliding toward the rotary drum 31 while seating the cassette holder 40 on the slider 50, is higher than the horizontal height of the eject lever 10 fixed on the rotation shaft 11a. Therefore, the previously proposed apparatus is disadvantageous in that the overall height of the deck including an unshown door is increased.

SUMMARY OF THE INVENTION

In view of the foregoing problems, it is an object of the present invention to provide a door mechanism for a tape recorder, capable of pivoting a door upwardly and downwardly, so that a cassette lid never contacts a door portion during loading of a tape cassette.

To achieve the above object of the present invention, there is provided a door mechanism for a tape recorder which includes a lower chassis and an upper chassis movably mounted on the lower chassis, an eject lever, pivotally mounted to the lower chassis and operative to be opened and closed by a predetermined angle with respect to the lower chassis to insert a tape cassette into the tape recorder, for raising and lowering the upper chassis with respect to the lower chassis, a cassette holder, which pivots by a predetermined angle around a pivot shaft, for receiving the tape cassette, and a slider which is installed with a pair of reels for guiding a hub of the tape cassette and, simultaneously, allows the cassette holder to move forwardly and backwardly on the upper chassis. The door mechanism of the tape recorder has a door which is hingedly coupled at one side of the eject lever for being opened and closed around a pivot during the pivoting of the eject lever. The door is positioned higher than a cassette lid of the tape cassette so as not to contact the cassette lid during a first loading mode or operation of the tape cassette, and is positioned as high as an upper end portion of the eject lever during the completion of a second loading mode or operation of the tape cassette. Furthermore, a link, connected between the door and the eject lever, is provided for guiding the opening and closing operation of the door during pivoting of the eject lever.

Preferably, the door includes an elongated hole which receives and guides one end of the link for making the door open and close around the pivot by movement of the one end of the link within the elongated hole while the eject lever pivots. Also, the link is formed in such a manner that the one end thereof is held within the elongated hole formed in the door, the other end thereof is held within an elongated hole formed near the pivot shaft of the eject lever, and a center portion thereof is pivotally mounted on the upper chassis, thereby making the door open and close when the eject lever pivots.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE PREFERRED EMBODIMENT

Figure 1:
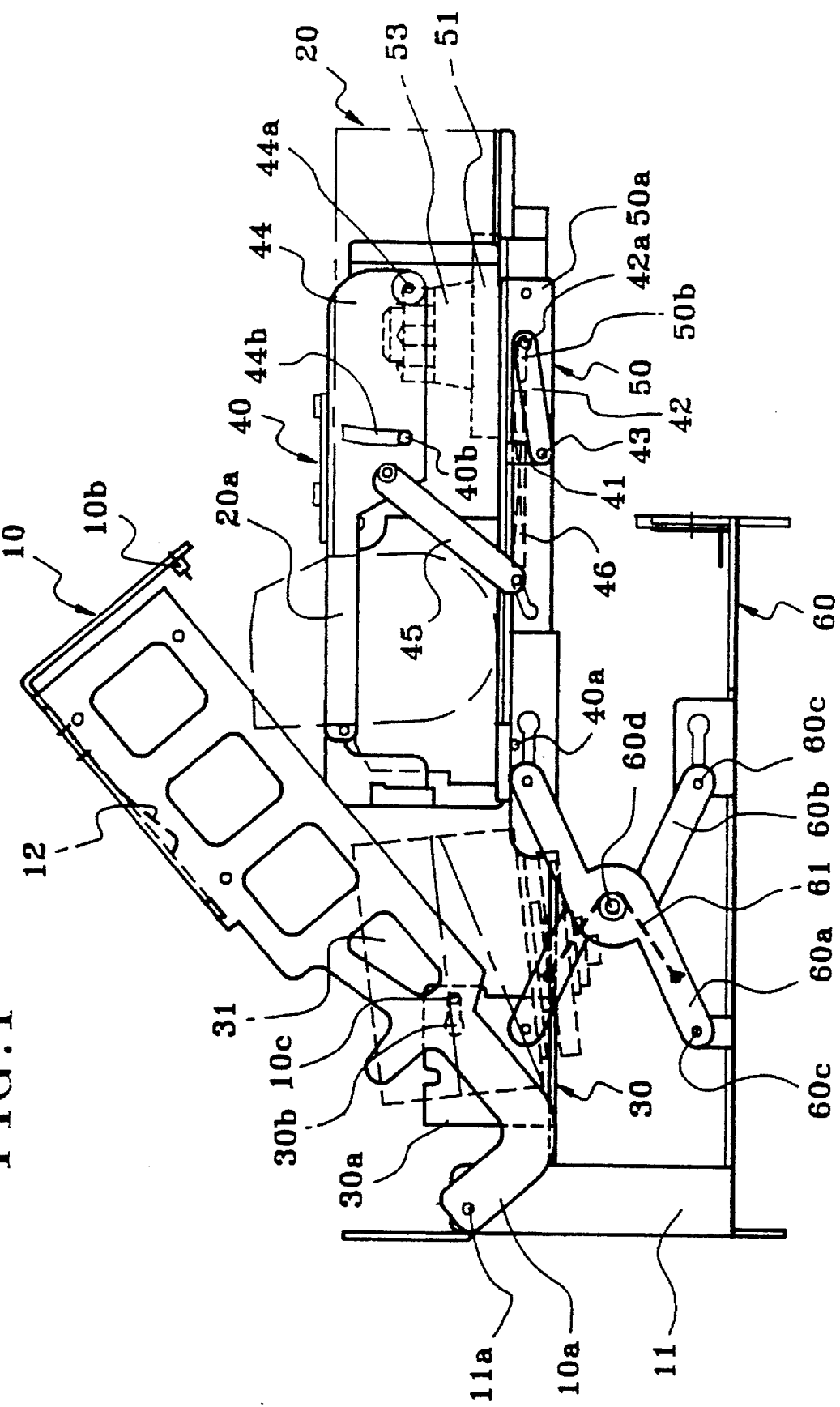
FIG. 1 is a schematic side view showing a tape recorder by a previously proposed technique.
Figure 2:
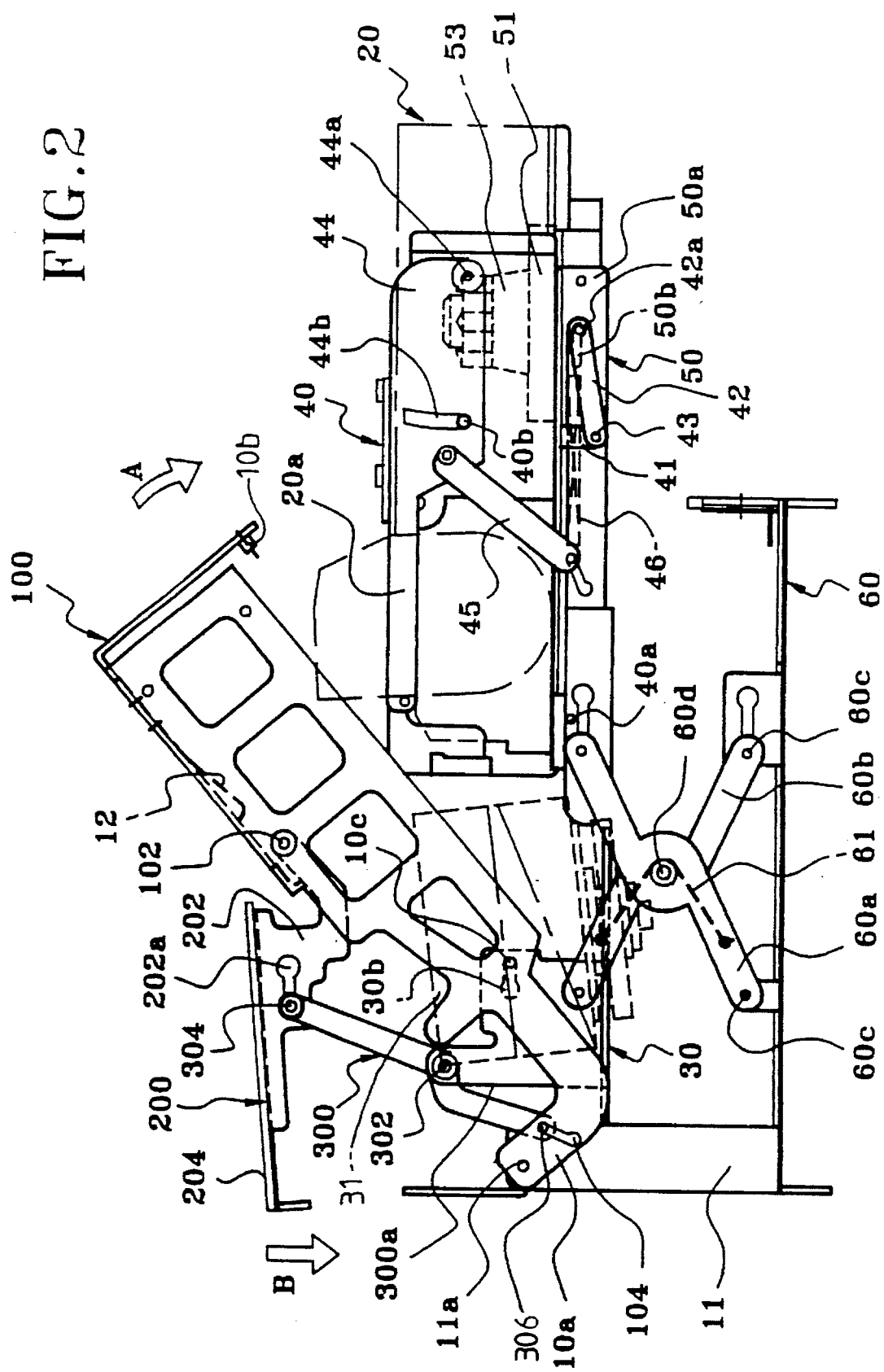
FIG. 2 is a schematic side view of a tape recorder provided with a door mechanism according to the present invention.

In FIG. 2 showing a tape recorder provided with a door mechanism according to the present invention, the same reference numerals as those shown in FIG. 1 designate the same parts of which description thus will be omitted, but the description of different portions will be presented.

As shown in FIG. 2, a door 200 installed on the roughly upper center of an eject lever 100 is coupled to a pivot shaft 102 to open/close around a pivot shaft 102 during the pivoting operation of the eject lever 100. The door 200 includes a rotation member 202 coupled to the pivot shaft 102 and a door board 204 adhered onto the rotation member 202.

The rotation member 202 has an elongated hole 202a which holds one end of a link 300 for allowing the door 200 to open/close when the link 300 is moved.

The center of the link 300 is fixed to a bracket 300a of an upper chassis 30 by means of a pin 302. The other end of the link 300 is fixed with a pin 304 which can be moved within the elongated hole 202a formed in the rotation member 202 of the door 200. The other end of the link 300 is fixed with a pin 306 which is moved within an elongated hole 104 around a pivot shaft 11a of the eject lever 100. Therefore, when the eject lever 100 begins to pivot, the pins 304 and 306 of the link 300 are guided within the elongated holes 202a and 104, so that the link 300 opens or closes the door 200. The operation of the door mechanism of the tape recorder according to the present invention will be described in detail hereinbelow.

FIG. 2 shows a state wherein a tape cassette 20 is inserted into a cassette holder 40 to allow the cassette holder 40 to be seated on a slider 50. Under this state, if a user pushes the cassette holder 40 to the left in FIG. 2, a slider transportation apparatus (not shown) horizontally moves the slider 50 toward the rotary drum 31. Thus, a first loading operation with respect to the rotary drum 31 is carried out.

During the first loading operation, the eject lever 100 maintains the state shown in FIG. 2. In this case, the pin 306 of the link 300 is fitted into one side of the elongated hole 104, and the pin 304 of the link 300 is fitted into one side of the elongated hole 202a in the rotation member 202 of the door 200. Accordingly, the eject lever 100 maintains the position shown in FIG. 2 neither pivoting upwardly nor downwardly. Moreover, the cassette lid 20a is placed underneath the door 200.

When a user presses the eject lever 100 to close the eject lever 100 after completing the first loading operation of the tape cassette 20, the eject lever 100 pivots in the direction of an arrow A around the pivot shaft 11a, wherein a pin 10c downwardly presses an elongated hole 30b in the bracket 300a, so that the bracket 300a descends resulting in the lowering of the upper chassis 30 toward the lower chassis 60.

Moreover, when the eject lever 100 pivots in the direction of arrow A, the rotation member 202 descends while pivoting about the pivot shaft 102. At this time, the pin 306 of the link 300 moves downwardly within the elongated hole 104 to make the door 200 descend in the direction of an arrow B.

Figure 3:
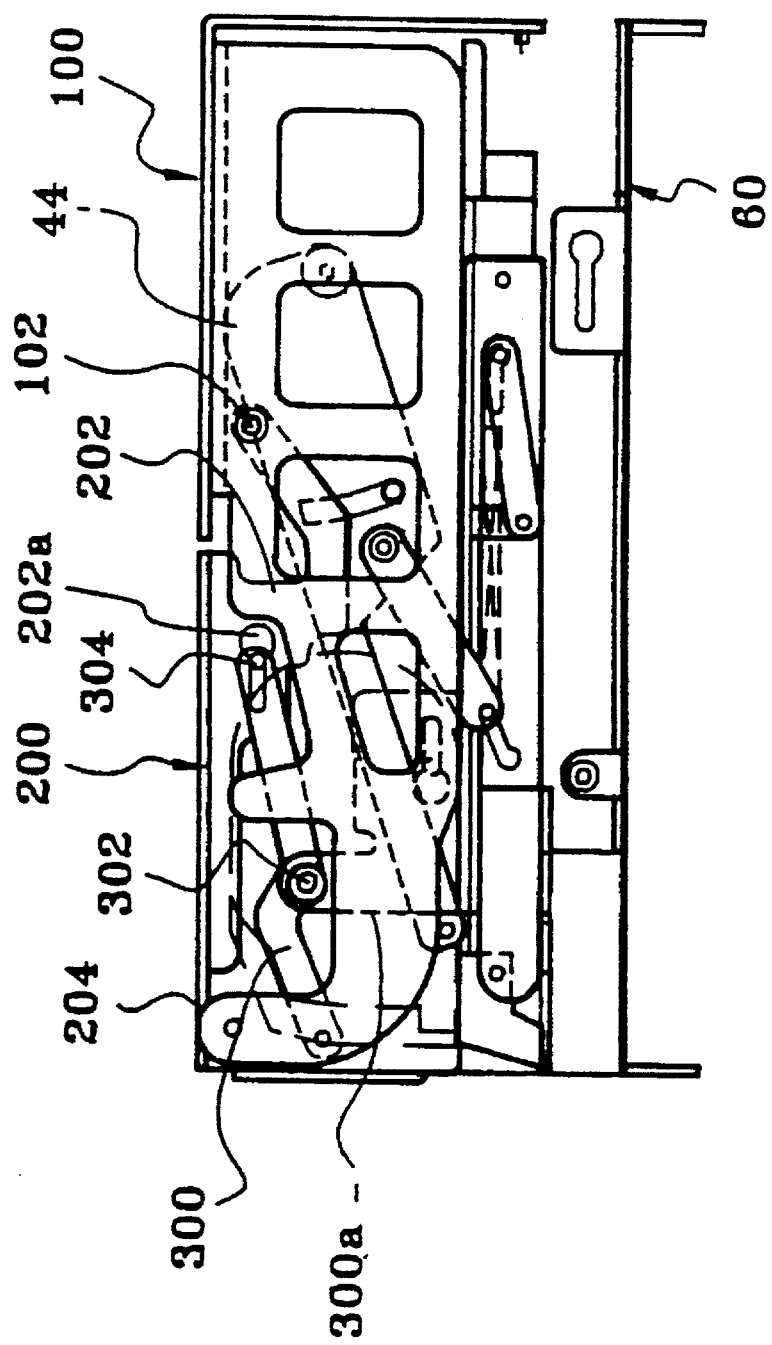
FIG. 3 is a schematic side view showing a state wherein the tape cassette is completely mounted.

If the eject lever 100 continuously descends in the arrow A direction to be locked to the lower chassis 60 by means of a locking pin 10b, a state shown in FIG. 3 will be obtained. In this condition, the door 200 is placed so as to be flush with the eject lever 100 in the horizontal direction.

When the tape cassette 20 is to be unloaded in the state shown in FIG. 3, the locking pin 10b is released from the lower chassis 60 so that the upper chassis 30 is moved upwardly by the repulsive and elastic force of links 60a and 60b. In this condition, the pin 10c is moved along the elongated hole 30b to move the eject lever 100 upwardly in the reverse direction of the arrow A. At the same time, as shown in FIG. 2, the link 300 pivots around the pin 302 to open the door 200.

As described above, in the door mechanism of the tape recorder according to the present invention, the door is positioned as high as the upper end portion of an eject lever when a second loading operation of a tape cassette is completed, so that the tape recorder can be designed to be extremely thin.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A door mechanism in a tape recorder which includes a lower chassis and an upper chassis movably mounted on the lower chassis, an eject lever, pivotally mounted to the lower chassis by means of a pivot shaft and operative to open and close by a predetermined angle with respect to the lower chassis to insert a tape cassette into the tape recorder, for raising and lowering the upper chassis with respect to the lower chassis, a cassette holder, pivotally mounted about a pivot shaft, for receiving the tape cassette, and a slider installed with a pair of reels for guiding a hub of the tape cassette and, simultaneously, allowing the cassette holder to be moved forwardly and backwardly on the upper chassis, said door mechanism comprising:

a door (200) hingedly coupled at one side of said eject lever (100) by a pivot for being opened and closed around said pivot during the pivoting of said eject lever; and a link (300), connected between said door and said eject lever, for guiding the opening and closing operation of said door during pivoting of said eject lever, said link having one end movably connected to said door, another end movably connected to said eject lever near said pivot shaft of said eject lever, and a center portion pivotally mounted on the upper chassis;

whereby said door is positioned flush with an upper portion of said eject lever during completion of a loading operation of the tape cassette.

2. The door mechanism in a tape recorder as claimed in claim 1, wherein said door is provided with an elongated hole which receives and guides said one end of said link for making said door open and close around said pivot by movement of said one end of said link within said elongated hole while said eject lever pivots.

3. The door mechanism in a tape recorder as claimed in claim 2, wherein said other end of said link is held within an elongated hole formed near said pivot shaft of said eject lever.

* * * * *